(12) United States Patent
Ruemer

(10) Patent No.: US 8,318,884 B2
(45) Date of Patent: *Nov. 27, 2012

(54) PROCESS FOR PRODUCING COLOURED POLYPROPYLENE COMPOSITION HAVING A HIGH CONTENT OF β-MODIFICATION

(75) Inventor: Franz Ruemer, Gusen (AT)

(73) Assignee: Borealis Technology Oy, Porvoo (FI)

( * ) Notice: Subject to any disclaimer, the term of this patent is extended or adjusted under 35 U.S.C. 154(b) by 285 days.

This patent is subject to a terminal disclaimer.

(21) Appl. No.: 12/734,920

(22) PCT Filed: Nov. 26, 2008

(86) PCT No.: PCT/EP2008/066180
§ 371 (c)(1),
(2), (4) Date: Jun. 2, 2010

(87) PCT Pub. No.: WO2009/071471
PCT Pub. Date: Jun. 11, 2009

(65) Prior Publication Data
US 2010/0255237 A1    Oct. 7, 2010

(30) Foreign Application Priority Data
Dec. 4, 2007 (EP) .................... 07122241

(51) Int. Cl.
*C08F 110/06* (2006.01)
*C08F 210/00* (2006.01)
*B29C 47/00* (2006.01)
*C08J 3/20* (2006.01)
*C08K 3/10* (2006.01)
*B28B 17/00* (2006.01)

(52) U.S. Cl. ....... 526/351; 526/348; 428/36.9; 523/351; 524/584; 524/413

(58) Field of Classification Search .................. 428/36.9; 523/351; 524/584, 413; 526/351, 348
See application file for complete search history.

(56) References Cited

U.S. PATENT DOCUMENTS

| | | | |
|---|---|---|---|
| 2005/0053741 A1* | 3/2005 | Ebner et al. | 428/36.91 |
| 2007/0172613 A1* | 7/2007 | Jacoby | 428/35.7 |
| 2010/0151172 A1* | 6/2010 | Emig et al. | 428/36.9 |
| 2010/0286332 A1* | 11/2010 | Ruemer | 524/584 |

FOREIGN PATENT DOCUMENTS

| | | |
|---|---|---|
| EP | 0 177 961 | 4/1986 |
| EP | 0 682 066 | 11/1995 |
| EP | 1 260 545 | 11/2002 |
| EP | 1 312 623 | 5/2003 |
| EP | 1 448 631 | 1/2006 |
| EP | 1 749 843 | 2/2007 |
| WO | WO 00/68315 | 11/2000 |
| WO | WO 03/042260 | 5/2003 |

OTHER PUBLICATIONS

Zweifel et al.; "Plastics Additives Handbook", 5th Edition; 2001; p. 849; Munich.
Pasquini; "Polypropylene Handbook"; 2005; pp. 15-141; Munich.

* cited by examiner

Primary Examiner — William Cheung
(74) Attorney, Agent, or Firm — Warn Partners, P.C.

(57) ABSTRACT

The invention relates to a novel process for producing coloured polypropylene compositions having a high content of β-modification, wherein polypropylene is melt blended with at least one inorganic pigment and at least one β-nucleating agent, wherein a1) polypropylene is melt blended with at least one inorganic pigment or with a first concentrate comprising the at least one inorganic pigment to obtain a coloured polypropylene and a2) the coloured polypropylene is melt blended with at least one β-nucleating agent or with a second concentrate comprising the at least one β-nucleating agent to obtain the coloured β-nucleated polypropylene composition or b1) polypropylene is melt blended with at least one β-nucleating agent or with a second concentrate comprising the at least one β-nucleating agent to obtain a β-nucleated polypropylene and b2) the β-nucleated polypropylene is melt blended with at least one inorganic pigment or with a first concentrate comprising the at least one inorganic pigment to obtain the coloured β-nucleated polypropylene composition or c) a third concentrate is produced by melt blending a first concentrate comprising the at least one inorganic pigment and a second concentrate comprising the at least one β-nucleating agent and the polypropylene is melt blended with the third concentrate to produce the coloured β-nucleated polypropylene composition or d) a first concentrate comprising the at least one inorganic pigment and a second concentrate comprising the at least one β-nucleating agent are melt blended with the polypropylene to obtain the coloured β-nucleated polypropylene composition.

20 Claims, No Drawings ns for pipes for
PROCESS FOR PRODUCING COLOURED POLYPROPYLENE COMPOSITION HAVING A HIGH CONTENT OF β-MODIFICATION This application is a National Stage of International Application No. PCT/EP2008/066180, filed Nov. 26, 2008. This application claims priority to European Patent Application No. 07122241.8 filed on Dec. 4, 2007. The disclosures of the above applications are incorporated herein by reference.

The present invention relates to a coloured polypropylene composition, in particular to a polypropylene composition containing an inorganic pigment and having a high content of β-modification and to a process for producing such a polypropylene composition.

BACKGROUND OF THE INVENTION

Polypropylene materials are frequently used for pipes for various purposes, such as fluid transport, i.e. transport of liquid or gas, e.g. water or natural gas, during which the fluid is pressurised and/or heated. In particular, polypropylene materials are used in applications for plumbing and heating, such as in-house hot and cold water pipes and fittings, floor and wall heating systems and radiator connections.

From EP1448631 it is known to use polypropylene which crystallises predominantly in the β-modification for pressure pipes having increased long-term pressure resistance. Polypropylene which crystallises predominantly in the β-modification has an increased impact strength compared to polypropylene when it is crystallised in the α-modification. Generally, the higher the amount of β-modification, the better the impact strength of the polypropylene will be.

With regard to polypropylene pipes, impact strength of pipes is often measured by the falling weight impact test at 0° C. according to EN 1411. For pipes this is a more practice-oriented parameter, since it correlates to the resistance of the pipe against breakage during installation, especially at low temperatures.

Further, it is customary to use coloured polypropylene for these applications. A number of organic and inorganic pigments exist, which are used for the production of coloured polypropylene. However, many organic pigments are unsuitable for the production of coloured polypropylene having a high content of β-modification, because organic pigments are often acting as strong α-nucleating agents. When both α-nucleating agents and β-nucleating agents are present in a polypropylene, the α-nucleating agent is usually predominant, because the α-modification is thermodynamically more favoured than the β-modification.

Inorganic pigments are favoured for the abovementioned purposes.

OBJECT OF INVENTION

It is therefore the object of the present invention to provide a process for producing coloured polypropylene compositions having a high content of β-modification, wherein polypropylene is melt blended with at least one inorganic pigment and at least one β-nucleating agent. Pipes, which are produced from the inventive polypropylene compositions shall exhibit higher impact strengths than pipes which are made from polypropylene compositions which were produced by prior art processes.

Surprisingly, the above object could be achieved by a process, wherein a1) polypropylene is melt blended with at least one inorganic pigment or with a first concentrate comprising the at least one inorganic pigment to obtain a coloured polypropylene and a2) the coloured polypropylene is melt blended with at least one β-nucleating agent or with a second concentrate comprising the at least one β-nucleating agent to obtain the coloured β-nucleated polypropylene composition or b1) polypropylene is melt blended with at least one β-nucleating agent or with a second concentrate comprising the at least one β-nucleating agent to obtain a β-nucleated polypropylene and b2) the β-nucleated polypropylene is melt blended with at least one inorganic pigment or with a first concentrate comprising the at least one inorganic pigment to obtain the coloured β-nucleated polypropylene composition or c) a third concentrate is produced by melt blending a first concentrate comprising the at least one inorganic pigment and a second concentrate comprising the at least one β-nucleating agent and the polypropylene is melt blended with the third concentrate to produce the coloured β-nucleated polypropylene composition or d) a first concentrate comprising the at least one inorganic pigment and a second concentrate comprising the at least one β-nucleating agent are melt blended with the polypropylene to obtain the coloured β-nucleated polypropylene composition.

It has surprisingly been observed, that a significantly higher content of polypropylene crystallising in the β-modification can be achieved by melt blending of polypropylene separately first with the inorganic pigment and secondly with the β-nucleating agent or vice versa by the melt blending of polypropylene with a concentrate produced from the melt blending of separate concentrates.

In the previously known process, the inorganic pigment is intimately mixed with the β-nucleating agent and a concentrate is produced by melt blending a polyolefin with this mixture. Coloured polypropylene compositions which are produced by the previously known process are obtained by melt blending this concentrate with polypropylene. Although this previously known process does have some economic advantages (one less melt blending step), it is unsatisfactory, because it achieves only contents of β-modification which are significantly lower than the inventive process.

Accordingly, the object of the invention is also achieved by a process, wherein β-nucleated polypropylene, which comprises a β-nucleating agent, is melt blended with at least one inorganic pigment or with a first concentrate comprising the at least one inorganic pigment to obtain the coloured β-nucleated polypropylene composition.

Further, the object of the invention is also achieved by a process, wherein coloured polypropylene, which comprises an inorganic pigment, is melt blended with at least one β-nucleating agent or with a second concentrate comprising the at least one β-nucleating agent to obtain the coloured β-nucleated polypropylene composition.

All of the aforementioned embodiments of the process of the invention make use of the same underlying principle of the invention, i.e. the separate addition of inorganic pigment and β-nucleating agent to the polypropylene. The adding of inorganic pigment and β-nucleating nucleating agent is either separate with respect to the order, in which the adding is performed, or it is at least separate with respect to the location of the inorganic pigment and β-nucleating agent, i.e. they are contained in separate concentrates. The requirement of separate addition of inorganic pigment and β-nucleating agent is even fulfilled, when separate concentrates are combined into a third concentrate, before this third concentrate is melt blended with the polypropylene.

According to a variant of the inventive process the coloured polypropylene composition is produced by melt blending polypropylene with the first and second concentrate. According to an advantageous embodiment of the invention, the coloured β-nucleated polypropylene composition is produced by first melt blending polypropylene with the first concentrate to produce a coloured polypropylene and subsequently melt blending the coloured polypropylene with the second concentrate to produce the coloured β-nucleated polypropylene composition with high content of β-modification.

According to a further advantageous embodiment of the invention, the coloured β-nucleated polypropylene composition is produced by first melt blending polypropylene with the second concentrate to produce a β-nucleated polypropylene and subsequently melt blending the β-nucleated polypropylene with the first concentrate to obtain the coloured β-nucleated polypropylene composition with high content of β-modification.

According to a still further advantageous embodiment of the invention, the coloured β-nucleated polypropylene composition is produced by melt blending polypropylene simultaneously with the first and second concentrate, i.e. in one melt blending step.

For the purpose of clarity it should be emphasised that the term "inorganic pigment" in the context of this invention encompasses only inorganic pigments which do not act as strong α-nucleating agents. Pigments, which are salts of organic acids are also considered as organic pigment in this regard.

Pigments, which act as α-nucleating agents should preferably be not present in the inventive polypropylene compositions at all, or only in such an amount, that they do not adversely affect the desired properties, i.e. mainly the increased content of β-modification and thus the impact strength.

The present invention is applicable to all kinds of polypropylene and polypropylene compositions comprising isotactic polypropylene. The isotacticity of polypropylene can be determined either by $^{13}$C-NMR or by Infrared spectroscopy. When it is determined by $^{13}$C-NMR, the isotacticity is determined as triade percentage (mm %) or as pentade percentage (mmmm %). For the used isotactic polypropylenes of the invention the triade percentage (mm %) is typically >80%, preferably >90%, still higher values (e.g. >95%) being still more preferred. Particularly, the present invention is applicable to polypropylenes selected from the group consisting of propylene homopolymers, propylene random copolymers, propylene heterophasic copolymers and mixtures thereof.

The polypropylene in accordance with the present invention typically has an MFR of from 0.05 to 10 g/10 min at 230° C./2.16 kg. Depending on the desired end use, the MFR may preferably be in the range of from 0.1 to 5 g/10 min and in embodiments the present invention contemplates MFR values of from 0.1 to 1 g/10 min, in particular for use in pipe applications or MFR values of from 2 to 3 g/10 min for the preparation of articles prepared by molding operations.

The polypropylene in accordance with the present invention may be prepared by using conventional catalysts, including Ziegler-Natta catalysts and single site catalysts (including metallocenes), which may be supported catalysts. Typical Ziegler-Natta catalysts are disclosed in e.g. WO 03/042260, incorporated herein by reference with respect to the description of catalyst components and polymerisation conditions.

Preparation of Polypropylenes
Production of Propylene Homopolymer and of Propylene Random Copolymer The polymerisation process for the production of the random propylene copolymers according to the invention may be a continuous process or a batch process utilising known methods and operating in liquid phase, optionally in the presence of an inert diluent, or in gas phase or by mixed liquid-gas techniques.

Accordingly, the random propylene copolymer may be produced by single- or multistage process polymerisation of propylene and α-olefin and/or ethylene such as bulk polymerisation, gas phase polymerisation, slurry polymerisation, solution polymerisation or combinations thereof using conventional catalysts. Preferably, the copolymer is made either in one or two loop reactor(s) or in a combination of loop and gas phase reactor. Those processes are well known to one skilled in the art.

The process is preferably carried out in the presence of a catalyst system which is stereospecific for polymerising isotactic polypropylene.

A suitable catalyst for the polymerisation of the propylene polymer is any stereospecific catalyst for propylene polymerisation which is capable of polymerising and copolymerising propylene and α-olefin-comonomers at a temperature of 40 to 110° C. and at a pressure from 10 to 100 bar. Ziegler Natta catalysts as well as metallocene catalysts are suitable catalysts. One skilled in the art is aware of the various possibilities to produce propylene homo- and copolymers and will simply find out a suitable procedure to produce suitable polymers which are used in the present invention, see e.g. Nello Pasquini (Ed.) Polypropylene Handbook, Hanser, Munich, 2005, pages 15-141.

The precise control of the polymerisation conditions and reaction parameters is within the state of the art. After the polymerisation in the first and the optional second reactor is finished, the polymer product is recovered by conventional procedures.

The resulting polymer particles may be pelletised in a conventional compounding extruder with various additives, which are generally used in thermoplastic polymer compositions, such as stabilisers, antioxidants, acid neutralising agents, ultraviolet absorbers, antistatic agents, etc.

Production of propylene homopolymer may be performed in an analogous manner, with the exception, that no comonomer (ethylene) is used in the polymerisation.

Heterophasic Propylene Copolymer

A heterophasic copolymer may be produced by multistage process polymerisation of propylene and ethylene and/or an α-olefin such as bulk polymerisation, gas phase polymerisation, slurry polymerisation, solution polymerisation or combinations thereof using conventional catalysts. Those processes are also well known to one skilled in the art.

A preferred process is a combination of a bulk slurry loop reactor(s) and gas phase reactor(s). A matrix polymer can be made either in loop reactors or in a combination of loop and gas phase reactor.

The polymer produced in this way is transferred into another reactor and the disperse phase, an ethylene/α-olefin rubber, is polymerised. Preferably this polymerisation step is done in a gas phase polymerisation.

A suitable catalyst for the polymerisation of a heterophasic propylene copolymer is any stereospecific catalyst for propylene polymerisation which is capable of polymerising and copolymerising propylene and comonomers at a temperature of 40 to 110° C. and at a pressure form 10 to 100 bar. Ziegler Natta catalysts as well as metallocene catalysts are suitable catalysts.

One skilled in the art is aware of the various possibilities to produce such heterophasic systems and will simply find out a suitable procedure to produce suitable heterophasic copolymers which can be used in the present invention.

A heterophasic polyolefin composition may also be produced by mixing and melt blending a propylene homopolymer with an ethylene/α-olefin rubber.

According to a preferred embodiment of the present invention, the first concentrate comprises the inorganic pigment and polypropylene. According to this embodiment, the polypropylene of the first concentrate may comprise any one from the group consisting of propylene homopolymers, propylene random copolymers, propylene heterophasic copolymers and mixtures thereof. The polypropylene(s) of the first concentrate may be different or identical to the β-nucleated polypropylene of the coloured polypropylene composition.

Typically, the polypropylene of the first concentrate is a polypropylene random copolymer having an ethylene content of between 1 and 5 wt % and having an MFR of between 1 and 10 g/10 min. A particularly preferred polypropylene for the first concentrate has an ethylene content of 3.7 wt % and an MFR of 2 g/10 min.

The concentration of inorganic pigment in the first concentrate depends on the type of pigment, but generally it may between 5 and 30 wt %, based on the weight of the concentrate.

The amount of concentrate is also dependant upon the type of pigment and its concentration in the first concentrate, and is generally between 0.5 and 10 wt % based on the weight of the polypropylene composition. Preferably, the amount of concentrate is between 1 and 5 wt %, typically about 2 wt %.

Generally the process of the invention is applicable to all inorganic pigments. In particular, the pigments listed in the following table are suitable for the process of the invention.

| Colour Index (C.I.) Designation | Chemical Formula (if known) | CAS Registry Number |
|---|---|---|
| C.I. pigment green 17 | $Cr_2O_3$ | CAS No. 68909-79-5 |
| C.I. pigment red 101 | $\alpha\text{-}Fe_2O_3$ | CAS No. 1309-37-1 |
| C.I. pigment yellow 53 | $(Ti,Ni,Sb)O_2$ | CAS No. 71077-18-4 |
| C.I. pigment yellow 119 | $ZnFe_2O_4$ | CAS No. 68187-51-9 |
| C.I. pigment yellow 157 | $2NiO \bullet 3BaO \bullet 17TiO_2$ | CAS No. 68610-24-2 |
| C.I. pigment yellow 161 | $(Ti,Ni,Nb)O_2$ | CAS No. 68611-43-8 |
| C.I. pigment yellow 162 | $(Ti,Cr,Nb)O_2$ | CAS No. 68611-42-7 |
| C.I. pigment yellow 163 | $(Ti,Cr,W)O_2$ | CAS No. 68186-92-5 |
| C.I. pigment yellow 164 | $(Ti,Mn,Sb)O_2$ | CAS No. 68412-38-4 |
| C.I. pigment yellow 184 | $BiVO_4/(Bi,Mo,V)O_3$ | CAS No. 14059-33-7 |
| C.I. pigment yellow 189 | $(Ti,Ni,W)O_2$ | CAS No. 69011-05-8 |
| C.I. pigment blue 28 | $CoAl_2O_4$ | CAS No. 68186-86-7 |
| C.I. pigment blue 36 | $Co(Al,Cr)_2O_4$ | CAS No. 68187-11-1 |
| C.I. pigment blue 36:1 | $(Zn,Co)(Cr,Al)_2O_4$ | CAS No. 74665-01-3 |
| C.I. pigment blue 72 | $(Co,Zn)Al_2O_4$ | CAS No. 68186-87-8 |
| C.I. pigment green 26 | $CoCr_2O_4$ | CAS No. 68187-49-5 |
| C.I. pigment green 50 | $(Co,Ni,Zn)_2TiO_4$ | CAS No. 68186-85-6 |
| C.I. pigment brown 24 | $(Ti,Cr,Sb)O_2$ | CAS No. 68186-90-3 |
| C.I. pigment brown 29 | $(Fe,Cr)_2O_3$ | CAS No. 12737-27-8 |
| C.I. pigment brown 33 | $(ZnFe)FeCr)_2O_4$ | CAS No. 68186-88-9 |
| C.I. pigment brown 35 | $Fe(FeCr)_2O_4$ | CAS No. 68187-09-7 |
| C.I. pigment brown 37 | $(Ti,Mn,Nb)O_2$ | CAS No. 70248-09-8 |
| C.I. pigment brown 39 | $(Zn,Mn)Cr_2O_4$ | CAS No. 71750-83-9 |
| C.I. pigment brown 40 | $(Ti,Mn,Cr,Sb)O_2$ | CAS No. 69991-68-0 |
| C.I. pigment brown 43 | $(Fe,Mn)_2O_3$ | CAS No. 12062-81-6 |
| C.I. pigment orange 75 | | CAS No. 12014-93-6 |
| C.I. pigment orange 78 | | CAS No. 12014-93-6 + 12031-49-1 |
| C.I. pigment red 265 | | CAS No. 12014-93-6 |
| C.I. pigment red 275 | | CAS No. 12014-93-6 |
| C.I. pigment blue 29 | $Na_{6-8}Al_6Si_6O_{24}S_{2-4}$ | CAS No. 57455-37-5 |
| C.I. pigment purple 15 | $Na_{6-8}Al_6Si_6O_{24}S_{2-4}$ | CAS No. 12769-96-9 |
| C.I. pigment purple 16 | $NH_4MnP_2O_7$ | CAS No. 10101-66-3 |

One of the usual colours which is used for such materials is green. The colour green is achieved by the use of specific inorganic pigments, especially the pigments C.I. Pigment Green 17, C.I. Pigment Green 26 and C.I. Pigment Green 50 (c.f. Plastics Additives Handbook, 5$^{th}$ Edition, Edited by Dr. Hans Zweifel, Carl Hanser Verlag, Munich 2001, p. 849). Chemically, C.I. Pigment Green 17 is $Cr_2O_3$. It is also identified by CAS No. 68909-79-5. Chemically, C.I. Pigment Green 26 is $CoCr_2O_4$. It is also identified by CAS No. 68187-49-5. Chemically, C.I. Pigment Green 50 is $(Co,Ni,Zn)_2TiO_4$. It is also identified by CAS No. 68186-85-6.

Especially preferred among the abovementioned inorganic green pigments is the green pigment identified by CAS No. 68186-85-6.

According to a preferred embodiment of the present invention, the second concentrate comprises the β-nucleating agent and polypropylene. According to this embodiment, the polypropylene of the second concentrate may comprise any one from the group consisting of propylene homopolymers, propylene random copolymers, propylene heterophasic copolymers and mixtures thereof. The polypropylene(s) of the second concentrate may be different or identical to the β-nucleated polypropylene of the coloured polypropylene composition.

Typically, the polypropylene of the second concentrate is a propylene homopolymer or a propylene random copolymer having an ethylene content of up to 5 wt % and having an MFR of between 1 and 20 g/10 min. A particularly preferred polypropylene for the second concentrate is a propylene homopolymer having an MFR of 10 g/10 min.

The concentration of β-nucleating agent in the second concentrate is strongly dependant on the type of nucleating agent, but generally it may be between 0.005 and 10 wt %, based on the weight of the concentrate.

The amount of concentrate is also dependant upon the type of β-nucleating agent and its concentration in the second concentrate, and is generally between 0.5 and 10 wt % based on the weight of the polypropylene composition. Preferably, the amount of concentrate is between 1 and 5 wt %, typically about 2 wt %.

Concentrates of any kind are typically produced by the following procedure:
combining the polypropylene which is used for the concentrate in the form of powder or granules with the pigment or the nucleating agent and with optionally additional additives in a melt mixing device and melting, homogenising and pelletising the blend. Melt mixing devices suited for this process are discontinuous and continuous kneaders, twin screw extruders and single screw extruders with special mixing sections and co-kneaders. The residence time must be chosen such that a sufficiently high degree of homogenisation is achieved.

According to the present invention, the polypropylene composition is at least partially crystallized in the β-modification. Preferably, the amount of β-crystallinity of the polypropylene composition is at least 60%, more preferably at least 70%, more preferably at least 75%.

Suitable types of β-nucleating agents are
dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, e.g.
N,N'-di-$C_5$-$C_8$-cycloalkyl-2,6-naphthalene dicarboxamide compounds such as N,N'-dicyclohexyl-2,6-naphthalene dicarboxamide and N,N'-dicyclooctyl-2,6-naphthalene dicarboxamide,
N,N'-di-$C_5$-$C_8$-cycloalkyl-4,4-biphenyldicarboxamide compounds such as N,N'-dicyclohexyl-4,4-biphenyldicarboxamide and N,N'-dicyclopentyl-4,4-biphenyldicarboxamide,
N.N'-di-$C_5$-$C_8$-cycloalkyl-terephthalamide compounds such as N.N'-dicyclohexylterephthalamide and N,N'-dicyclopentylterephthalamide,
N,N'-di-$C_5$-$C_8$-cycloalkyl-1,4-cyclohexanedicarboxamide compounds such as N,N'-dicyclo-hexyl-1,4-cyclohexanedicarboxamide and N,N'-dicyclohexyl-1,4-cyclopentanedicarboxamide,
diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, e.g.
N.N'—$C_6$-$C_u$-arylene-bis-benzamide compounds such as N,N'-p-phenylene-bis-benzamide and N,N'-1,5-naphthalene-bis-benzamide,
N.N'—$C_5$-$C_8$-cycloalkyl-bis-benzamide compounds such as N,N'-1,4-cyclopentane-bis-benzamide and N,N'-1,4-cyclohexane-bis-benzamide,
N.N'-p-$C_6$-$C_{12}$-arylene-bis-$C_5$-$C_8$-cycloalkylcarboxamide compounds such as N,N'-1,5-naphthalene-bis-cyclohexanecarboxamide and N,N'-1,4-phenylene-bis-cyclohexanecarboxamide, and
N.N'—$C_5$-$C_8$-cycloalkyl-bis-cyclohexanecarboxamide compounds such as N,N'-1,4-cyclopentane-bis-cyclohexanecarboxamide and N,N'-1,4-cyclohexane-bis-cyclohexanecarboxamide,
amino acid derivative type diamide compounds from amidation reaction of $C_5$-$C_8$-alkyl, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, e.g.
N-phenyl-5-(N-benzoylamino)pentaneamide and N-cyclohexyl-4-(N-cyclohexyl-carbonylamino)benzamide.

Further suitable β-nucleating agents are
quinacridone type compounds, e.g.
quinacridone, dimethylquinacridone and dimethoxyquinacridone,
quinacridonequinone type compounds, e.g.
quinacridonequinone, a mixed crystal of 5,12-dihydro(2,3b)acridine-7,14-dione with quino(2,3b)acridine-6,7,13,14-(5H,12H)-tetrone and dimethoxyquinacridonequinone and
dihydroquinacridone type compounds, e.g. dihydroquinacridone, dimethoxydihydroquinacridone and dibenzodihydroquinacridone.

Still further suitable β-nucleating agents are
salts of dicarboxylic acids with metals of group II of the periodic table, particularly salts of dicarboxylic acids with at least 7 carbon atoms with metals from group II of the periodic table, e.g. pimelic acid calcium salt and suberic acid calcium salt; and
mixtures of dicarboxylic acids and salts of metals from group IIa of periodic system.

Still further suitable β-nucleating agents are
salts of metals from group IIa of periodic system and imido acids of the formula

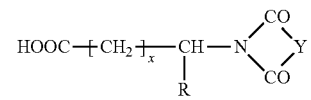

wherein x=1 to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl-substituted bivalent $C_6$-$C_{12}$-aromatic residues, e.g.
calcium salts of phthaloylglycine, hexahydrophthaloylglycine, N-phthaloylalanine and/or N-4-methylphthaloylglycine.

Especially suitable β-nucleating agents are any one or mixtures of N,N'-dicyclohexyl-2,6-naphtalene dicarboxamide, the β-nucleating agents of EP 177961 and those of EP 682066, the disclosure of which patent publications is incorporated herein by reference.

Particularly preferred β-nucleating agents are N,N'-dicyclohexyl-2,6-naphthalene dicarboxamide, 5,12-dihydroquino(2,3-b)acridine-7,14-dione, quino(2,3-b)acridine-6,7,13,14(5H,12H)-tetrone, salts of dicarboxylic acids with at least 7 carbon atoms with metals of group II of the periodic table, and mixtures thereof.

Such β-nucleating agents may be employed in amounts of from 0.0001 to 2.0 wt %, preferably 0.001 to 1.0 wt %, more preferably 0.003 to 0.3 wt % and most preferably 0.003 to 0.25 wt %, based on the weight of the final polypropylene composition. Preferred β-nucleating agents selected from quinacridone pigments illustrated above preferably are used in amounts of 0.001 to 0.01 wt %, such as 0.005 wt %, while other preferred β-nucleating agents selected among the Group II metal salts of dibasic carboxylic acids, such as pimelic acid calcium salt and suberic acid calcium salt are preferably employed in amounts of 0.05 to 0.3 wt %, such as 0.2 wt %.

The polypropylene composition of the present invention may further comprise usual additives and auxiliary substances, such as up to 40 wt % of fillers, 0.01 to 2.5 wt % of stabilizers, 0.01 to 1 wt % of processing aids, and 0.1 to 1 wt % of antistatic agents.

The polypropylene compositions of the present invention are preferably produced by
a) combining the polypropylene and the first and the second concentrate in the form of powder or granules and optionally additional additives in a melt mixing device and melting, homogenising and pelletising the blend. Melt mixing devices suited for this process are discontinuous and continuous kneaders, twin screw extruders and single screw extruders with special mixing sections and co-kneaders.
b) Alternatively, the coloured polypropylene compositions of the present invention may be produced by combining the first and second concentrate and optional additives in a melt mixing device and melting, homogenising and pelletising the blend to produce a third concentrate. The third concentrate is then combined with the polypropylene and optionally additional additives in a melt mixing device and melting, homogenising and pelletising the blend to produce the coloured polypropylene composition. The coloured β-nucleated polypropylene compositions of the invention may further be produced by combining the polypropylene and the inorganic pigment or the first concentrate comprising the inorganic pigment and optional additives in a melt mixing device and melting, homogenising and pelletising the blend to obtain a coloured polypropylene. Subsequently the coloured polypropylene is combined with the β-nucleating agent or the second concentrate comprising the β-nucleating agent and optional additives in a melt mixing device and melting, homogenising and pelletising the blend to obtain the coloured β-nucleated polypropylene composition.

c) The coloured β-nucleated polypropylene compositions of the invention may further be produced by combining the polypropylene and the β-nucleating agent or the second concentrate comprising the β-nucleating agent and optional additives in a melt mixing device and melting, homogenising and pelletising the blend to obtain a β-nucleated polypropylene. Subsequently the β-nucleated polypropylene is combined with the inorganic pigment or the first concentrate comprising the inorganic pigment and optional additives in a melt mixing device and melting, homogenising and pelletising the blend to obtain the coloured β-nucleated polypropylene composition.

d) The coloured β-nucleated polypropylene compositions of the invention may further be produced by combining a coloured polypropylene comprising an inorganic pigment with a β-nucleating agent or a second concentrate comprising the β-nucleating agent and optional additives in a melt mixing device and melting, homogenising and pelletising the blend to obtain the coloured β-nucleated polypropylene composition.

e) The coloured β-nucleated polypropylene compositions of the invention may further be produced by combining a β-nucleated polypropylene comprising a β-nucleating agent with an inorganic pigment or a first concentrate comprising an inorganic pigment and optional additives in a melt mixing device and melting, homogenising and pelletising the blend to obtain the coloured β-nucleated polypropylene composition.

In all of the above mentioned cases the residence times must be chosen such that a sufficiently high degree of homogenisation is achieved.

In accordance therewith, the present invention provides molded articles prepared using the coloured β-nucleated polypropylene composition as defined herein. Preferably, the molded article is selected among pipes, fittings and other articles required for pipe connections. Pipes as prepared from the polypropylene composition in accordance with the present invention may be employed for various purposes, in particular pipes in accordance with the present invention may be employed as hot water pipes for household applications and as pipes used for industrial purposes, such as for transporting hot and/or pressurized fluids as well as non-pressurized fluids.

Pipes made from the coloured β-nucleated polypropylene compositions of the invention can be produced with standard pipe extruders, such as single screw extruders with an L/D of 20 to 40 or twin screw extruders or extruder cascades of homogenizing extruders (single screw or twin screw). Optionally, a melt pump and/or a static mixer can be used additionally between the extruder and the ring die head. Ring shaped dies with diameters ranging from approximately 16 to 2000 mm and even greater are possible.

After leaving the annular die, the pipe is taken off over a calibrating mandrel, usually accompanied by cooling of the pipe by air cooling and/or water cooling, optionally also with inner water cooling.

EXAMPLES

Measurement Methods
MFR Melt Flow Rate

Melt flow rate (MFR) was measured according to ISO 1133, at 230° C. and with a load of 2.16 kg (MFR 2.16 kg/230° C.).

Comonomer Content

Ethylene content in polypropylene was measured by Fourier transmission infrared spectroscopy (FTIR). A thin film of the sample (thickness approximately 250 μm) was prepared by hot-pressing. The area of —$CH_2$— absorption peak (800-650 $cm^{-1}$) was measured with Perkin Elmer FTIR 1600-spectrometer. The method was calibrated by ethylene content data measured by $^{13}C$ NMR.

Determination of β-crystallinity

The β-crystallinity was determined by Differential Scanning Calorimetry (DSC). DSC was run according to ISO 3146/part 3/method C2 with a scan rate of 10° C./min. The amount of β-modification was calculated from the second heat by the following formula:

$$\beta\text{-area}/(\alpha\text{-area}+\beta\text{-area})$$

Since the thermodynamically instable β-modification starts to be changed into the more stable α-modification at temperatures above 150° C., a part of the β-modification is transferred within the heating process of DSC-measurement. Therefore the amount of β-PP determined by DSC is lower as when measured according to the method of Turner-Jones by WAXS (A. Turner-Jones et. al., Makromol. Chem 75 (1964) 134).

"Second heat" means, that the sample is heated according to ISO 3146/part 3/method C2 for a first time and then cooled to room temperature at a rate of 20° C./min. The sample is then heated a second time, also according to ISO 3146/part 3/method C2. This second heat is relevant for measurement and calculation.

During the "first heat" all thermal history of the sample giving rise to different crystalline structure, which typically comes from different processing conditions and/or methods, is destroyed. By using the second heat for determination of β-crystallinity, it is possible to compare samples regardless of the way the samples were originally manufactured.

Pipe falling weight impact is determined according to EN 1411 on diameter 32 mm pipes with a wall thickness of 4.4 mm at 0° C. The H50 value in millimeters is calculated.

Production of the Pipes

The pipes were produced by feeding the polypropylene composition in pellet form into a conventional Cincinnati pipe extruder for extrusion with a line speed of about 1 m/min into diameter 32 mm pipes with a wall thickness of 4.4 mm.

Used Materials

Polymer1: random copolymer of propylene with ethylene. Ethylene content 3.6 wt %. MFR=0.2 g/10 min (2.16 kg, 230° C.).

MB1:
 77.01 wt % propylene copolymer (ethylene 3.7 wt %, MFR 2.0 g/10 min)
 16.0 wt % Co/Ni/Zn/Ti-Oxide P.Green 50 (CAS No. 68186-85-6)

0.25 wt % Cinquasia Gold YT-923-D (quinacridone pigment orange 48)

MB2:
  77.26 wt % propylene copolymer (ethylene 3.7 wt %, MFR 2.0 g/10 min)
  16.0 wt % Co/Ni/Zn/Ti-Oxide P.Green 50 (CAS No. 68186-85-6)

MB3:
  99.15 wt % propylene homopolymer (MFR 10.0 g/10 min)
  0.25 wt % Cinquasia Gold YT-923-D (quinacridone pigment orange 48)

Cinquasia Gold YT-923-D (quinacridone pigment orange 48) (CAS No. 1503-48-6), which is commercially available from Ciba Specialty Chemicals, was used as β-nucleating agent in the examples.

Polymer1 contained the following additives and stabilisers:
0.25 wt % 1,3,5-tri-methyl-2,4,6-tris-(3,5-di-tert.butyl-4-hydroxyphenyl)benzene
0.25 wt % Pentaerythrityl-tetrakis(3-(3',5'-di-tert.butyl-4-hydroxyphenyl)-propionate
0.1 wt % Tris (2,4-di-t-butylphenyl)phosphite
0.03 wt % synthetic hydrotalcite (SHT)
0.07 wt % calcium stearate

TABLE 1

|  | Polymer1 [wt %] | MB1 [wt %] | MB2 [wt %] | MB3 [wt %] |
|---|---|---|---|---|
| Example 1 | 98 | — | — | 2 |
| Example 2 | 96 | — | 2 | 2 |
| Example 3 | 98 | 2 | — | — |

Table 1 shows the used amounts of the polymers and concentrates.

TABLE 2

|  | DSC | | | | | |
|---|---|---|---|---|---|---|
|  | peak 1 [° C.] | peak 2 [° C.] | HM1 [Jg$^{-1}$] | HM2 [Jg$^{-1}$] | β-content [%] | Tk [° C.] |
| Example 1 | 132.3 | 147.1 | 67.5 | 15.8 | 81.0 | 106.7 |
| Example 2 | 133.1 | 148.4 | 55.4 | 15.4 | 78.2 | 109.8 |
| Example 3 | 132.0 | 144.0 | 48.8 | 28.9 | 62.8 | 108.3 |

Table 2 shows the effect of the invention. When the β-nucleating agent and the pigment are dosed via separate concentrates as in Example 2, it is again possible to achieve almost such a high content of β-modification as in Example 1, where no pigment was used.

TABLE 3

| | Falling weight pipe test | | |
|---|---|---|---|
|  | min [mm] | max [mm] | H50 [mm] |
| Example 2 | 1700 | 2300 | 1987 |
| Example 3 | 900 | 1200 | 1010 |

The effect of the increased content of β-modification is shown in Table 3. The falling weight pipe test, performed at 0° C., yields a result which is almost double as high (H50 values) for Example 2 as for Example 3. This is indicative for a significantly increased impact strength.

I claim:

1. A process for producing a coloured β-nucleated polypropylene composition having a high content of β-modification, wherein polypropylene is melt blended with at least one inorganic pigment and at least one β-nucleating agent, selected from the steps comprising
   A) polypropylene is melt blended with at least one inorganic pigment or with a first concentrate comprising the at least one inorganic pigment to obtain a coloured polypropylene, and, the coloured polypropylene is melt blended with at least one β-nucleating agent or with a second concentrate comprising the at least one β-nucleating agent to obtain the coloured β-nucleated polypropylene composition, or,
   B) polypropylene is melt blended with at least one β-nucleating agent or with a second concentrate comprising the at least one β-nucleating agent to obtain a β-nucleated polypropylene, and, the β-nucleated polypropylene is melt blended with at least one inorganic pigment or with a first concentrate comprising the at least one inorganic pigment to obtain the coloured β-nucleated polypropylene composition, or,
   C) a third concentrate is produced by melt blending a first concentrate comprising the at least one inorganic pigment and a second concentrate comprising the at least one β-nucleating agent and the polypropylene is melt blended with the third concentrate to produce the coloured β-nucleated polypropylene composition, or,
   D) a first concentrate comprising the at least one inorganic pigment and a second concentrate comprising the at least one β-nucleating agent are melt blended with the polypropylene to obtain the coloured β-nucleated polypropylene composition,
   wherein the at least one inorganic pigment is selected from the group consisting of: C.I. pigment green 17 (CAS No. 68909-79-5) ($Cr_2O_3$), C.I. pigment red 101(CAS No. 1309-37-1) (a-$Fe_2O_3$), C.I. pigment yellow 53 (CAS No. 71077-18-4) ((Ti,Ni,Sb)$O_2$), C.I. pigment yellow 119 (CAS No. 68187-51-9) (ZnFe$_2O_4$), C.I. pigment yellow 157 (CAS No. 68610-24-2) (2NiO.3BaO.17Ti$O_2$), C.I. pigment yellow 161 (CAS No. 68611-43-8) ((Ti,Ni,Nb)$O_2$), C.I. pigment yellow 162 (CAS No. 68611-42-7) ((Ti,Cr,Nb)$O_2$), C.I. pigment yellow 163 (CAS No. 68186-92-5) ((Ti,Cr,W)$O_2$), C.I. pigment yellow 164 (CAS No. 68412-38-4) ((Ti,Mn,Sb)$O_2$), C.I. pigment yellow 184 (CAS No. 14059-33-7) (BiVO4/(Bi,Mo,V)$O_3$), C.I. pigment yellow 189 (CAS No. 69011-05-8) ((Ei,Ni,W)O2), C.I. pigment blue 28 (CAS No. 68186-86-7) (CoAl$_2O_4$), C.I. pigment blue 36 (CAS No. 68187-11-1) (Co(Al,Cr)$_2O_4$), C.I. pigment blue 36:1 (CAS No. 74665-01-3) ((Zn,Co)(Cr, Al)$_2O_4$), C.I. pigment blue 72 (CAS No. 68186-87-8) ((Co,Zn)Al$_2O_4$), C.I. pigment blue 29 (CAS No. 57455-37-5)(Na$_{6-8}$Al$_6$Si$_6$O$_{24}$S$_{2-4}$), C.I. pigment green 50 (CAS No. 68186-85-6) ((Co,Ni,Zn)$_2$TiO$_4$), C.I. pigment brown 24 (CAS No. 68186-90-3) ((Ti,Cr,Sb)$O_2$), C.I. pigment brown 29 (CAS No. 12737-27-8) ((Fe,Cr)$_2O_3$), C.I. pigment brown 33 (CAS No. 68186-88-9) ((ZnFe)FeCr)$_2$ $O_4$), C.I. pigment brown 35 (CAS No. 68187-09-7) (Fe (FeCr)$_2O_4$), C.I. pigment brown 37 (CAS No. 70248-09-8) ((Ti,Mn,Nb)$O_2$), C.I. pigment brown 39 (CAS No. 71750-83-9) ((Zn,Mn)Cr$_2O_3$), C.I. pigment brown 40 (CAS No. 69991-68-0) ((Ti,Mn,Cr,Sb)$O_2$), C.I. pigment brown 43 (CAS No. 12062-81-6) ((Fe,Mn)$_2$ $O_3$), C.I. pigment orange 75 (CAS No. 12014-93-6), C.I. pigment orange 78 (CAS No. 12014-93-6), C.I. pigment red 265 (CAS No. 12014-93-6), C.I. pigment red 275 (CAS No.

12014-93-6), C.I. pigment blue 29 (CAS No. 57455-37-5)($Na_{6-8}Al_6Si_6O_{24}S_{2-4}$), C.I. pigment purple 15 (CAS No. 12769-96-9 ($Na_{6-8}Al_6Si_6O_{24}S_{2-4}$), and C.I. pigment purple 16 (CAS No. 10101-66-3 ($NH_4MnP_2O_7$)).

2. A process for producing a coloured β-nucleated polypropylene composition having a high content of β-modification, wherein β-nucleated polypropylene, which comprises a β-nucleating agent, is melt blended with at least one inorganic pigment or with a first concentrate comprising the at least one inorganic pigment to obtain the coloured β-nucleated polypropylene composition, wherein the at least one inorganic pigment is selected from the group consisting of: C.I. pigment green 17 (CAS No. 68909-79-5) ($Cr_2O_3$), C.I. pigment red 101 (CAS No. 1309-37-1)(a-$Fe_2O_3$), C.I. pigment yellow 53 (CAS No. 71077-18-4) ((Ti,Ni,Sb)$O_2$), C.I. pigment yellow 119 (CAS No. 68187-51-9) ($ZnFe_2O_4$), C.I. pigment yellow 157 (CAS No. 68610-24-2) (2NiO.3BaO.17$TiO_2$), C.I. pigment yellow 161 (CAS No. 68611-43-8) ((Ti,Ni,Nb)$O_2$), C.I. pigment yellow 162 (CAS No. 68611-42-7) ((Ti,Cr,Nb)$O_2$), C.I. pigment yellow 163 (CAS No. 68186-92-5) ((Ti,Cr,W)$O_2$), C.I. pigment yellow 164 (CAS No. 68412-38-4) ((Ti,Mn,Sb)$O_2$), C.I. pigment yellow 184 (CAS No. 14059-33-7) (BiVO4/(Bi,Mo,V)$O_3$), C.I. pigment yellow 189 (CAS No. 69011-05-8) ((Ei,Ni,W) O2), C.I. pigment blue 28(CAS No. 68186-86-7) (Co$Al_2O_4$), C.I. pigment blue 36 (CAS No. 68187-11-1) (Co(Al,Cr)$_2O_4$), C.I. pigment blue 36:1 (CAS No. 74665-01-3) ((Zn,Co)(Cr,Al)$_2O_4$), C.I. pigment blue 72 (CAS No. 68186-87-8) ((Co,Zn)$Al_2O_4$), C.I. pigment blue 29 (CAS No. 57455-37-5) ($Na_{6-8}Al_6Si_6O_{24}S_{2-4}$), C.I. pigment green 50 (CAS No. 68186-85-6) ((Co,Ni,Zn)$_2TiO_4$), C.I. pigment brown 24 (CAS No. 68186-90-3)((Ti,Cr,Sb)$O_2$), C.I. pigment brown 29 (CAS No. 12737-27-8) ((Fe,Cr)$_2O_3$1, C.I. pigment brown 33 (CAS No. 68186-88-9) ((ZnFe)Fe$Cr)_2O_4$), C.I. pigment brown 35 (CAS No. 68187-09-7) (Fe(FeCr)$_2O_4$), C.I. pigment brown 37 (CAS No. 70248-09-8) ((Ti,Mn,Nb)$O_2$), C.I. pigment brown 39 (CAS No. 71750-83-9) ((Zn,Mn)$Cr_2O_4$), C.I. pigment brown 40 (CAS No. 69991-68-0) ((Ti,Mn,Cr,Sb)$O_2$), C.I. pigment brown 43 (CAS No. 12062-81-6) ((Fe,Mn)$_2O_3$), C.I. pigment orange 75 (CAS No. 12014-93-6), C.I. pigment orange 78(CAS No. 12014-93-6), C.I. pigment red 265 (CAS No. 12014-93-6), C.I. pigment red 275 (CAS No. 12014-93-6), C.I. pigment blue 29 (CAS No. 57455-37-5) ($Na_{6-8}Al_6Si_6O_{24}S_{2-4}$), C.I. pigment purple 15 (CAS No. 12769-96-9 ($Na_{6-8}Al_6Si_6O_{24}S_{2-4}$), and C.I. pigment purple 16 (CAS No. 10101-66-3 ($NH_4MnP_2O_7$)).

3. A process for producing a coloured β-nucleated polypropylene composition having a high content of β-modification, wherein coloured polypropylene, which comprises an inorganic pigment, is melt blended with at least one β-nucleating agent or with a second concentrate comprising the at least one β-nucleating agent to obtain the coloured β-nucleated polypropylene composition, wherein the at least one inorganic pigment is selected from the group consisting of: C.I. pigment green 17 (CAS No. 68909-79-5) ($Cr_2O_3$), C.I. pigment red 101 (CAS No. 1309-37-1) (a-$Fe_2O_3$), C.I. pigment yellow 53 (CAS No. 71077-18-4) ((Ti,Ni,Sb)$O_2$), C.I. pigment yellow 119 (CAS No. 68187-51-9) ($ZnFe_2O_4$), C.I. pigment yellow 157 (CAS No. 68610-24-2) (2NiO.3BaO.17$TiO_2$), C.I. pigment yellow 161 (CAS No. 68611-43-8) ((Ti,Ni,Nb)$O_2$), C.I. pigment yellow 162 (CAS No. 68611-42-7) ((Ti,Cr,Nb)$O_2$), C.I. pigment yellow 163 (CAS No. 68186-92-5) ((Ti,Cr,W)$O_2$), C.I. pigment yellow 164 (CAS No. 68412-38-4) ((Ti,Mn,Sb)$O_2$), C.I. pigment yellow 184 (CAS No. 14059-33-7) (BiVO4/(Bi,Mo,V)$O_3$), C.I. pigment yellow 189 (CAS No. 69011-05-8) ((Ei,Ni,W) O2), C.I. pigment blue 28 (CAS No. 68186-86-7) (Co$Al_2O_4$), C.I. pigment blue 36 (CAS No. 68187-11-1) (Co(Al,Cr)$_2O_4$), C.I. pigment blue 36:1 (CAS No. 74665-01-3) ((Zn,Co)(Cr,Al)$_2O_4$), C.I. pigment blue 72 (CAS No. 68186-87-8) ((Co,Zn)$Al_2O_4$), C.I. pigment blue 29 (CAS No. 57455-37-5) ($Na_{6-8}Al_6Si_6O_{24}S_{2-4}$), C.I. pigment green 50 (CAS No. 68186-85-6) ((Co,Ni,Zn)$_2TiO_4$), C.I. pigment brown 24 (CAS No. 68186-90-3) ((Ti,Cr,Sb)$O_2$), C.I. pigment brown 29 (CAS No. 12737-27-8) ((Fe,Cr)$_2O_3$), C.I. pigment brown 33 (CAS No. 68186-88-9) ((ZnFe)Fe$Cr)_2O_4$), C.I. pigment brown 35 (CAS No. 68187-09-7) (Fe(FeCr)$_2O_4$), C.I. pigment brown 37 (CAS No. 70248-09-8) ((Ti,Mn,Nb)$O_2$), C.I. pigment brown 39 (CAS No. 71750-83-9) ((Zn,Mn)$Cr_2O_4$), C.I. pigment brown 40 (CAS No. 69991-68-0) ((Ti,Mn,Cr,Sb)$O_2$), C.I. pigment brown 43 (CAS No. 12062-81-6) ((Fe,Mn)$_2O_3$), C.I. pigment orange 75 (CAS No. 12014-93-6), C.I. pigment orange 78(CAS No. 12014-93-6), C.I. pigment red 265 (CAS No. 12014-93-6), C.I. pigment red 275 (CAS No. 12014-93-6), C.I. pigment blue 29 (CAS No. 57455-37-5) ($Na_{6-8}Al_6Si_6O_{24}S_{2-4}$), C.I. pigment purple 15 (CAS No. 12769-96-9 ($Na_{6-8}Al_6Si_6O_{24}S_{2-4}$), and C.I. pigment purple 16 (CAS No. 10101-66-3 ($NH_4MnP_2O_7$)).

4. Process according to claim 1, wherein the polypropylene is selected from the group consisting of propylene homopolymers, propylene random copolymers, propylene heterophasic copolymers and mixtures thereof.

5. Process according to claim 1, wherein the first concentrate comprises polypropylene.

6. Process according to claim 1, wherein the inorganic pigment comprises an inorganic green pigment.

7. Process according to claim 6, wherein the inorganic green pigment comprises the green pigment identified by CAS No. 68186-85-6.

8. Process according to claim 1, wherein the second concentrate comprises polypropylene.

9. Process according to claim 1, wherein the at least one β-nucleating agent is selected from the group consisting of N,N'-dicyclohexyl-2,6-naphthalene dicarboxamide, 5,12-dihydro-quino(2,3-b)acridine-7,14-dione, quino(2,3-b)acridine-6,7,13,14(5H,12H)-tetrone, salts of dicarboxylic acids with at least 7 carbon atoms with metals of group II of the periodic table, and mixtures thereof.

10. Process according to claim 1, wherein the β-nucleating agent comprises quino(2,3-b)acridine-6,7,13,14(5H,12H)-tetrone and 5,12-dihydro-quino (2 ,3-b)acridine-7,14-dione.

11. Coloured β-nucleated polypropylene composition obtained by a process according to claim 1.

12. Molded article comprised of the polypropylene composition according to claim 11.

13. Pipe comprised of the polypropylene composition according to claim 11.

14. Process according to claim 2, wherein the first concentrate comprises polypropylene.

15. Process according claim 2, wherein the inorganic pigment comprises an inorganic green pigment.

16. Process according to claim 2, wherein the at least one β-nucleating agent is selected from the group consisting of N,N'-dicyclohexyl-2,6-naphthalene dicarboxamide, 5,12-dihydro-quino(2,3-b)acridine-7,14-dione, quino(2,3-b)acridine-6,7,13,14(5H,12H)-tetrone, salts of dicarboxylic acids with at least 7 carbon atoms with metals of group II of the periodic table, and mixtures thereof.

17. Process according to claim 3, wherein the at least one β-nucleating agent is selected from the group consisting of N,N'-dicyclohexyl-2,6-naphthalene dicarboxamide, 5,12-dihydro-quino(2,3-b)acridine-7,14-dione, quino(2,3-b) acridine-6,7,13,14(5H,12H)-tetrone, salts of dicarboxylic acids with at least 7 carbon atoms with metals of group II of the periodic table, and mixtures thereof.

18. Process according claim 3, wherein the inorganic pigment comprises an inorganic green pigment.

19. Process according to claim 3, wherein the second concentrate comprises polypropylene.

20. Process according to claim 3, wherein the β-nucleating agent comprises quino(2,3-b)acridine-6,7,13,14(5H,12H)-tetrone and 5,12-dihydro-quino (2,3-b)acridine-7,14-dione.

* * * * *